April 21, 1953 W. C. HOYT, SR 2,635,750
BERRY-PICKING MACHINE
Filed June 25, 1949 2 SHEETS—SHEET 2
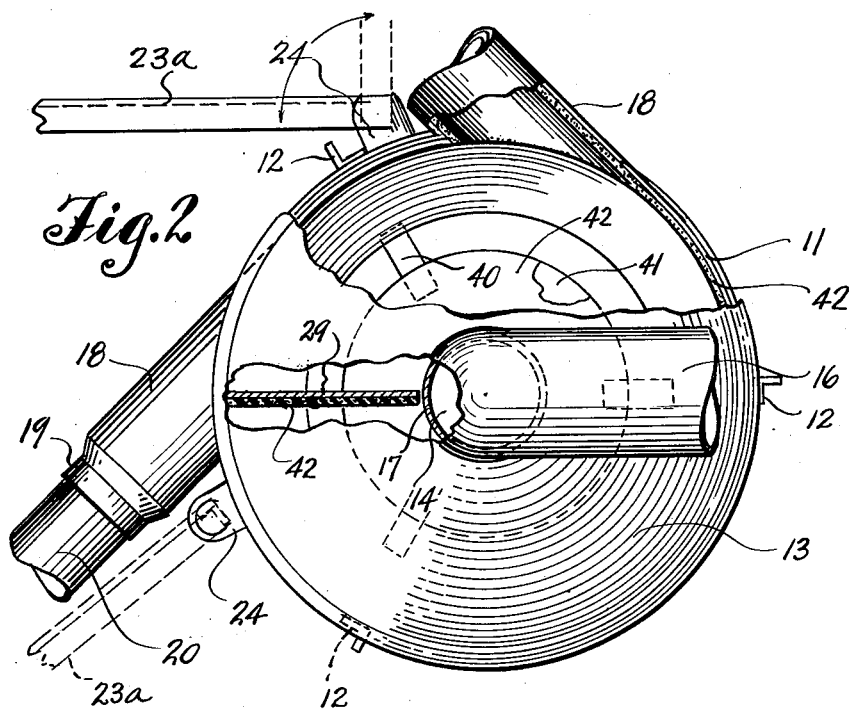
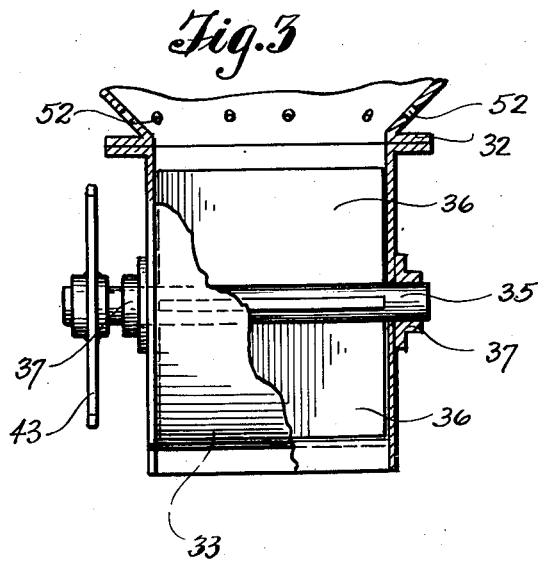
Inventor
WILLIAM C. HOYT SR.
By Cook & Robinson
Attorney Patented Apr. 21, 1953

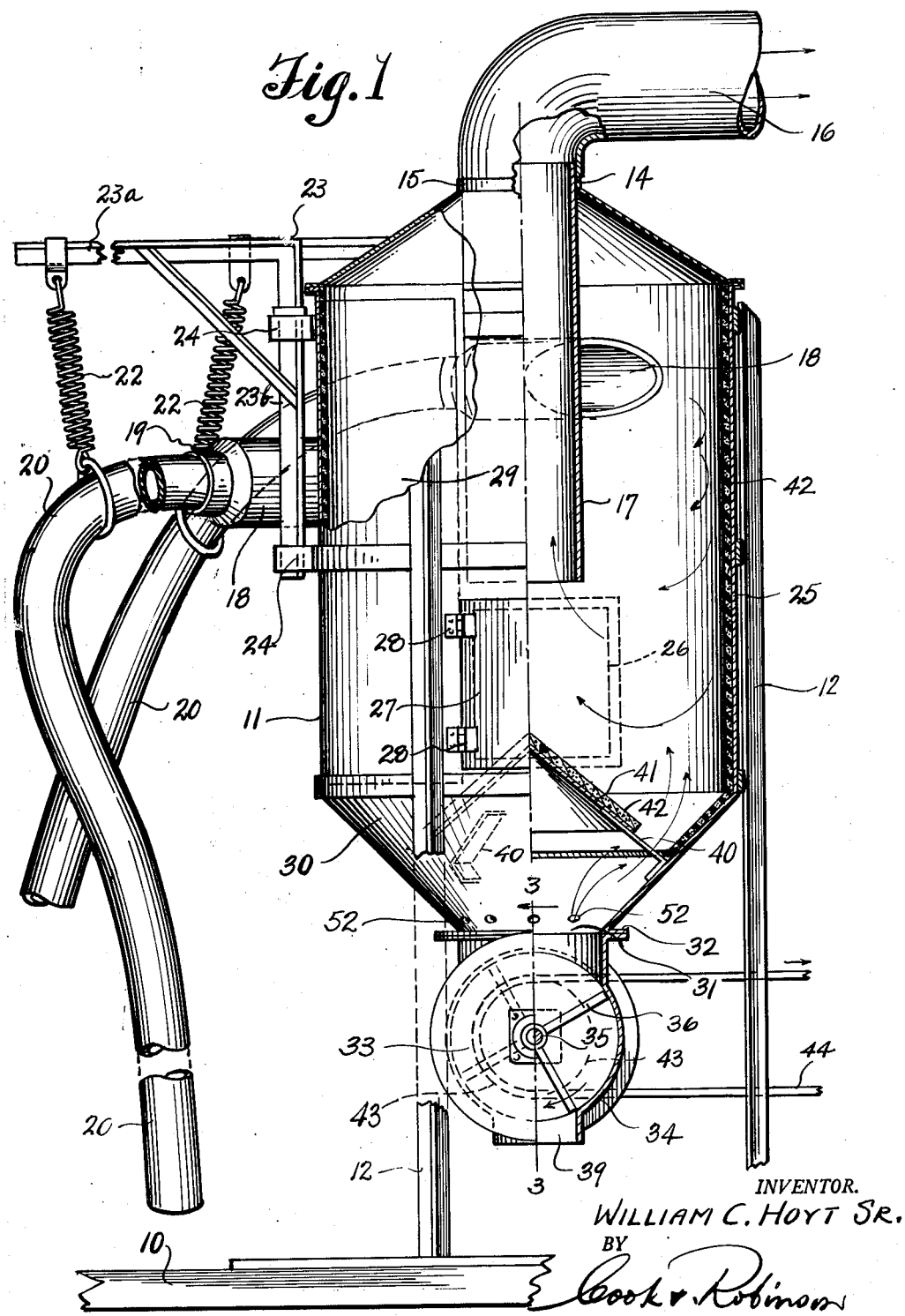

2,635,750

UNITED STATES PATENT OFFICE 2,635,750

BERRY-PICKING MACHINE

William C. Hoyt, Sr., Aberdeen, Wash.

Application June 25, 1949, Serial No. 101,340

2 Claims. (Cl. 209—144)

This invention relates to mobile berry picking machines, and it has reference more particularly to improvements in machines employing air suction for the picking of berries of those particular kinds which, due to their character, or by reason of the character of the plants on which they grow, are difficult to pick by hand.

It is the principal object of this invention to provide an improved type of pneumatic machine for the rapid, economic and satisfactory picking of cranberries, and the like, utilizing air suction for the stripping or picking of the berries from the plants on which they grow, and for effecting the partial separation therefrom of the seeds, leaves, twigs, vines, etc., which might be drawn into the machine along with the berries.

Another object of the invention is to provide means for preventing the bruising of the berries when discharged into the machine.

Another object of the invention is to provide a berry picker that automatically effects partial separation of twigs and leaves from the berries and deposits the seeds, leaves, twigs and vines in a receptacle bag provided therefor so that they will not be redeposited in the field.

A further object of the invention is to provide means for the continuous unloading of berries from the machine without necessitating the interruption of the berry-picking operation.

Still another object of this invention is to provide an easily portable machine that will accommodate a plurality of berry pickers.

Further objects of the invention reside in the details of construction of parts embodied in the machine, in their combination, relationship and mode of use as will hereinafter be fully described.

In accomplishing these and other objects of the invention, I have provided the improved details of construction, the preferred forms of which are illustrated in the accompanying drawings, wherein:

Fig. 1 is a side view of the present machine, showing a part of the separator housing in vertical section for better understanding of enclosed parts.

Fig. 2 is a top or plan view of the machine, a part of the top and side wall of the separator housing being broken away for better illustration of enclosed parts.

Fig. 3 is an enlarged cross-sectional view of the discharge valve on line 3—3 in Fig. 1.

Briefly described, the present berry picking machine is a portable unit comprising a closed housing of cylindrical shape forming a vertical separator chamber to the upper end of which a suction pipe, leading from an air suction device, is connected. Opening into the chamber, in a tangential direction, through a side wall of the housing, are a plurality of suction manifolds from which flexible sucker tubes are extended for use in picking the berries from the plants.

The housing has a downwardly sloped bottom wall, above which an upwardly pointed, cone-shaped deflector is supported and centered to cushion the fall of the berries and to cause them to be deflected into a discharge valve secured to a flange projected from the bottom wall of the housing. The discharge valve is so constructed as to permit the unloading of berries therefrom during the continued operation of the machine and without breaking the vacuum in the suction chamber.

The present machine is intended to be mounted for use upon a mobile vehicle, such as a truck, or trailer, or the like, that may be driven or drawn over the field of plants from which the berries are to be picked. Therefore, in Fig. 1 of the drawing, I have designated, by reference numeral 10, what may be a part of the flat bed of a truck on which the present machine and parts associated therewith are operatively mounted.

In its present preferred form, the machine comprises a closed, cylindrical housing 11, vertically disposed, and functionally mounted on the bed 10 by a plurality of legs 12 that are fixed thereto. The housing preferably is made of sheet metal, and the legs of angle iron.

At its upper end, the housing is closed by a top wall 13, shown as being upwardly pointed and formed with a central opening 14 circumvented by an upwardly extended flange 15 to which a suction pipe 16 is connected. Pipe 16 leads from the separator housing to the suction side of an air suction device (not shown) that preferably is mounted on the bed 10. This latter device may be a suction blower of any suitable type and it might be driven by any suitable power device, such as a gas engine or electric motor (not herein shown) through a belt and pulley or other suitable form of driving connection.

Extending downwardly from the opening 14, into the separator chamber enclosed by the housing, is a tube 17 which is in fact a continuation of pipe 16, and this tube extends downwardly to the lower half of the housing chamber.

Opening into the upper portion of the housing chamber through a side wall of the housing, and in a tangential direction and in circumferentially and vertically spaced relationship, are suction manifolds 18—18, which at their outer ends are adapted to receive and retain flexible sucker tubes 20—20. These sucker tubes are of such length as to extend from the housing to the bushes or plants from which the berries are to be picked, and are made as light as practical. For the picking of some kinds of berries the tubes may be left open at their outer ends. For other kinds they may be equipped with suction nozzles (not shown) which are more effective in producing the desired suction effect.

In order to provide for easier handling of the suction tubes by the pickers, it is preferred that each tube be suspended as seen in Fig. 1, by a spring hanger 22 from the horizontal arm 23a of a boom 23 that is fixed to the housing 11. Each boom comprises a vertical base member 23b rotatable in vertically spaced brackets 24 that are fixed to the housing 11 and in which the boom 23 rotates and permits the arm 23a to swing across the end of the truck from side to side thereof.

In the lower portion of the side wall 25 of the housing is an opening 26 normally closed by a door 27 that is attached to the housing by hinges 28—28. This door is of sufficient size to permit a workman to extend his arm therethrough into the housing to remove such matter as has not been drawn out through the suction tube 17, and also to provide a means whereby the interior of the housing may be readily cleaned or inspected. Normally, the door is closed over the opening 26 to make possible the maintenance of a partial vacuum in the housing chamber during the operation of the machine.

Projected from the inner side wall 25 of the housing and at right angles thereto, is a vertical baffle plate 29 that extends the full length of the side wall 25 and projects inwardly toward, but not touching, the tube 17 in the center of the housing.

The bottom wall 30 of the housing is conically shaped and downwardly pointed, and has a central opening 31. Welded to the under side of the bottom wall around the opening 31, is a flange 32. Suspended from the flange 32 is a discharge valve which I have designated in its entirety by numeral 33. The discharge valve comprises a valve housing 34 forming a cylindrical chamber containing a rotary valve. The valve comprises a horizontal mounting shaft 35 to which are fixed four equally spaced and radially directed partitions 36. The shaft is rotatably mounted in bearings 37—37 fixed to opposite side walls of the valve housing.

The rotary valve is so constructed that a close tolerance is achieved between the plates 36 and the inner wall of the valve chamber, thus to insure maintaining a partial vacuum in the compartment of the valve that is in direct communication with the opening 31. In the bottom of the valve housing is an opening 39 through which the berries may be discharged into a basket or other suitable container (not shown). As is illustrated in Fig. 3, the shaft 35 extends outwardly beyond the bearing 37 and is equipped with a sprocket 43. This sprocket is mounted in fixed position on the shaft and is provided to be functionally rotated by a sprocket chain 44. The chain is driven by a motor or other source of power (not shown) or may be driven from the same source of power that operates the suction device. When the machine is in operation, the rotating chain causes the valve to be constantly rotating and discharging the berries therefrom.

Mounted on the inner or top side of the bottom wall 30 are brackets 40 which support an upwardly pointed cone-shaped deflector 41. This deflector is centered above the opening 31 to the discharge valve 33 and is of greater diameter than the said opening, and its peripheral edge is spaced from the bottom of the housing so as not to obstruct the passing of the berries into the discharge valve.

It is desirable to provide a cushioned lining for the inner chamber of the housing. This lining is made of sponge rubber sheets, or other suitable material that will prevent the berries from being bruised when discharged into the housing. Such lining is designated at 42 in Figs. 1 and 2 and it is adhesively secured or may be held in place by other suitable means such as rivets. The lining, when properly applied, substantially covers the inner surface of the side walls 25, the top surface of the cone 41 and that surface of the baffle 29, as noted in Fig. 2, against which the berries might or do engage when drawn into the chamber.

Assuming the machine to be so constructed, it is used as follows: With the housing opening 26 covered by the door 27, the operation of the suction device (not shown) will cause air to be drawn from the housing 11 and suction to be created in the manifolds 18 and transmitted to the several sucker tubes 20. Persons handling the sucker tubes will extend the suction nozzles among the plants and the berries will be picked or sucked off and drawn into the tubes and finally into the separator chamber through the manifolds 18—18 which discharge the berries tangentially into the chamber.

The berries, due to their weight and size, will tend to spiral downwardly in the housing and to effect a more abrupt drop of the berries, twigs and leaves, the baffle plate 29 is provided as an obstruction to the rotating action. The berries will fall against the bottom wall 30 or on the cone 41 and roll through the bottom opening 31 into the upwardly disposed compartment of the discharge valve 33. The twigs and leaves, due to their lighter weight and character will, for the most part, be sucked from the housing through pipes 17 and 16.

The berries which fall into the valve 33 are readily and continually unloaded from the valve as the rotating partitions 36 pass above the opening 39 and the berries are discharged therethrough. As was previously stated, the valve member is rotatably contained in the valve chamber with the plates 36 disposed in such close proximity to the wall thereof that the vacuum in the separator housing is not affected or reduced by the discharge function from the valve. The rotary action of this discharge valve is effected through mediacy of the mounting shaft which extends to the outside of the valve housing and is driven by the sprocket wheel 43, which is in turn motivated by a sprocket chain 44.

As an additional feature to insure better separation of leaves, twigs and dirt from the berries, I have provided a plurality of air inlet ports 52 opening into the separator housing through the bottom wall 30 and closely adjacent the opening into the valve housing. These ports are beneath the conical baffle and thus suction as created above will cause an upflow of air from beneath the edges of the conical baffle that tends to prevent any chaff or leaves from entering the valve housing.

The tangential direction of the suction manifolds 18 entering the separator housing, causes the berries to be delivered tangentially against the cushioned surfaces of the side walls of the housing and thus minimize the injury to the berries.

Such machines may be made in various sizes and might be equipped with one or more of the suction manifolds as found necessary or desirable for the work being done.

It is apparent also that changes in details of construction might be made without departing from the spirit of the invention, and for this reason it is not desired that the claims shall be confined strictly to the details shown, but that they shall be given an interpretation that is commensurate with the invention disclosed.

Having thus described my invention, what I claim as new therein and desire to secure by Letters Patent is:

1. A separator comprising a vertically disposed cylindrical housing forming a separator chamber, a hopper at the lower end of the chamber having an outlet, a valve housing connected with said hopper and into which berries received in the hopper will gravitate by passage through said outlet, a suction tube leading into the separator chamber coaxially thereof and through its upper end wall, to a level substantially below the upper end of the chamber, a suction manifold opening into the upper end of the chamber tangentially through a side wall, a vertical baffle plate extending along and inwardly from a side wall of the chamber substantially the full length thereof, an upwardly pointed conical deflector supported at the base of the chamber over the hopper outlet and slightly spaced about its edges from the hopper wall.

2. A separator comprising a cylindrical housing vertically disposed and forming a separator chamber, an air suction means extended centrally through the upper end wall of the housing and extended substantially into the chamber, suction manifolds opening into the chamber near its upper end and tangentially through its side walls, a vertical baffle plate fixed to and projecting inwardly from a side wall of the chamber, extending across the level of the suction manifolds, and an upwardly pointed, conical deflector supported from the bottom wall and slightly spaced at its peripheral edges from the bottom of the chamber; said bottom wall having airports therethrough beneath the said conical deflector and said chamber having a bottom opening therein below the conical deflector, a valve housing arranged to receive berries through said opening, and a rotary discharge valve in said housing.

WILLIAM C. HOYT, Sr.

References Cited in the file of this patent

UNITED STATES PATENTS

| Number | Name | Date |
|---|---|---|
| 126,117 | Wemple | Apr. 23, 1872 |
| 398,788 | Mundy | Feb. 26, 1889 |
| 414,980 | Kutsche | Nov. 12, 1889 |
| 911,258 | Neumann | Feb. 2, 1909 |
| 1,185,110 | Le Baron | May 30, 1916 |
| 1,344,146 | Peck | June 22, 1920 |
| 1,383,984 | Clark | July 5, 1921 |
| 1,514,915 | Lankhuff | Nov. 11, 1924 |
| 1,675,941 | Lindsay | July 3, 1928 |
| 2,001,184 | Cuppy | May 14, 1935 |
| 2,131,672 | Rich | Sept. 27, 1938 |
| 2,143,421 | Loehr | Jan. 10, 1939 |
| 2,155,911 | Shaw | Apr. 25, 1939 |
| 2,471,326 | Hoyt, Sr. | May 24, 1949 |
| 2,482,362 | Park | Sept. 20, 1949 |

FOREIGN PATENTS

| Number | Country | Date |
|---|---|---|
| 4,227 | Great Britain | Nov. 30, 1888 |
| 236,371 | Germany | Nov. 5, 1910 |
| 193,132 | Great Britain | Feb. 15, 1923 |